United States Patent
Dhillon et al.

(10) Patent No.: US 11,023,202 B2
(45) Date of Patent: Jun. 1, 2021

(54) ENHANCED AUTOCORRECT FEATURES USING AUDIO INTERFACE

(71) Applicant: INTERNATIONAL BUSINESS MACHINES CORPORATION, Armonk, NY (US)

(72) Inventors: Jill Dhillon, Austin, TX (US); Michael Bender, Rye Brook, NY (US); Jeremy R. Fox, Georgetown, TX (US); Kulvir S. Bhogal, Fort Worth, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/425,288

(22) Filed: May 29, 2019

(65) Prior Publication Data
US 2020/0379725 A1   Dec. 3, 2020

(51) Int. Cl.
| | | |
|---|---|---|
| G06F 3/048 | (2013.01) | |
| G06F 3/16 | (2006.01) | |
| G06N 20/00 | (2019.01) | |
| G10L 15/26 | (2006.01) | |
| G10L 21/0208 | (2013.01) | |
| G06F 40/242 | (2020.01) | |
| G06F 40/284 | (2020.01) | |

(52) U.S. Cl.
CPC ............ *G06F 3/167* (2013.01); *G06F 40/242* (2020.01); *G06F 40/284* (2020.01); *G06N 20/00* (2019.01); *G10L 15/26* (2013.01); *G10L 21/0208* (2013.01)

(58) Field of Classification Search
CPC ..... G10L 15/00; G10L 15/26; G10L 21/0208; G06F 17/00; G06F 3/048; G06F 3/016; G06F 40/284; G06F 3/167; G06N 20/00
See application file for complete search history.

(56) References Cited

U.S. PATENT DOCUMENTS

| | | | |
|---|---|---|---|
| 5,761,689 A * | 6/1998 | Rayson ................. | G06F 40/232 715/210 |
| 7,296,019 B1 | 11/2007 | Cahndrasekar et al. | |
| 7,881,936 B2 | 2/2011 | Longe et al. | |
| 8,355,914 B2 * | 1/2013 | Joh ....................... | G06F 40/232 704/235 |
| 9,164,983 B2 * | 10/2015 | Liu ....................... | G06F 40/274 |
| 10,318,632 B2 * | 6/2019 | Osborne ................. | G06F 40/10 |
| 2005/0128181 A1 * | 6/2005 | Wang .................. | G06K 9/00436 345/156 |
| 2006/0217159 A1 * | 9/2006 | Watson ............. | H04M 1/72522 455/563 |
| 2008/0045172 A1 * | 2/2008 | Narayanaswami .... | G06Q 30/02 455/187.1 |
| 2011/0201387 A1 | 8/2011 | Paek et al. | |
| 2012/0127071 A1 | 5/2012 | Jitkoff et al. | |

(Continued)

*Primary Examiner* — Rashawn N Tillery
(74) *Attorney, Agent, or Firm* — Tutunjian & Bitetto, P.C.; Michael Petrocelli (57) ABSTRACT

A system and computer-implemented method are provided for enabling an audio interface enhanced autocorrect feature in a mobile device. The method includes detecting activation of an autocorrect feature of a mobile device in response to a portion of text not appearing in a system dictionary, enabling a microphone in response to activation of the autocorrect feature, receiving audio input from a user responsive to a word replacement by the autocorrect feature, and implementing an enhanced autocorrect action based on the audio input.

20 Claims, 5 Drawing Sheets

(56) References Cited

U.S. PATENT DOCUMENTS

| | | |
|---|---|---|
| 2013/0268260 A1 | 10/2013 | Lundberg et al. |
| 2013/0311179 A1 | 11/2013 | Wagner |
| 2015/0113073 A1 | 4/2015 | Chan et al. |
| 2015/0220778 A1* | 8/2015 | Macciola ............. G06K 9/2018 382/112 |
| 2016/0163308 A1 | 6/2016 | LeBeau et al. |
| 2017/0269688 A1 | 9/2017 | Chan et al. |
| 2018/0032499 A1* | 2/2018 | Hampson ............. G06F 40/253 |

* cited by examiner

ENHANCED AUTOCORRECT FEATURES USING AUDIO INTERFACE

BACKGROUND

The present invention generally relates to autocorrect implementations on a device having a computer, and more particularly to enhanced autocorrect features implementing an audio interface.

Autocorrect has been implemented on mobile devices to address spelling and typing errors. However, in certain cases an autocorrect system modifies text that is perceived as a typing or spelling error because the system doesn't recognize a word. Manually overriding autocorrect requires going back and forcing selection of the original word in mid-typing, thus interrupting a user's thought and consuming time.

SUMMARY

In accordance with an embodiment of the present disclosure, a computer-implemented method for enabling an audio interface enhanced autocorrect feature in a mobile device is provided. The method includes detecting activation of an autocorrect feature of a mobile device in response to a portion of text not appearing in a system dictionary; enabling a microphone in response to activation of the autocorrect feature; receiving audio input from a user responsive to a word replacement by the autocorrect feature; and implementing an enhanced autocorrect action based on the audio input.

In another aspect, an embodiment in accordance with the present disclosure provides a system for enabling an audio interface enhanced autocorrect feature in a mobile device. The system includes a display screen configured to present a graphical user interface, storage structured to store data and processor executable instruction code, and a processor operationally coupled with the display screen and storage. The processor is configured to execute the instruction code stored in the storage to operatively detect activation of an autocorrect feature of a mobile device in response to a portion of text not appearing in a system dictionary, enable a microphone in response to activation of the autocorrect feature, receive audio input from a user responsive to a word replacement by the autocorrect feature, and implement an enhanced autocorrect action based on the audio input.

In yet another aspect, an embodiment in accordance with the present disclosure provides a computer program product having one or more computer readable storage mediums collectively storing program instructions that are executable by a processor or programmable circuitry to cause the processor or programmable circuitry to perform operations including: detecting activation of an autocorrect feature of a mobile device in response to a portion of text not appearing in a system dictionary; enabling a microphone in response to activation of the autocorrect feature; receiving audio input from a user responsive to a word replacement by the autocorrect feature; analyzing the audio input to determine the desired word; and implementing an enhanced autocorrect action based on the audio input.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

In the following detailed description of embodiments of the present disclosure, with reference to the various figures, like numerals represent the same or similar elements and structures.

Autocorrect on a mobile device accounts for spelling and typing errors on mobile devices. It has been determined that the features of autocorrect have been too greatly enriched. For example, it has been determined that in some instances autocorrect functions are modifying text that it perceives as a typing or spelling error because the system does not recognize a word. Additionally, the system may force the user to manually override the autocorrections, which means that the user go back and manually make a correction, or selection of a term, in mid-typing of a message. This can reduce the speed that the user can generate a message.

In some embodiments, the methods, systems and computer program products of the present disclosure can improve how a user interfaces with an device running an autocorrect application on a mobile device. The methods, systems and computer program products that are described herein can utilize haptic feedback when autocorrect is about to process text, and then can enable the microphone for the mobile device for a window of time to allow the user to say a word that the user would like employed in an autocorrect function, or allow the user to accept selections provided by the autocorrect application for a term that was typed by voice command, e.g., by saying "typed as-is".'

In some embodiments, the systems described herein are configurable so that the system is not turned on all the time. For example, the user can select operation modes for the system, such as enabled, disabled, or intelligent mode. In one example, intelligent mode may provide two features: 1) Listen to the ambient noise to determine if the noise is too loud to get easy responses that will actually improve the user experience, and 2) use cognitive learning to enable/disable the function based on time, location, noise level, user activity, e.g., the user talking on the phone, or other configurable events to learn when the user is employing or ignoring this feature.

The methods, systems and computer products that are described herein can enable an audio interface to enhance the autocorrect typing features of using a mobile device based on configuring settings for an individual; using machine learning to determine if the audio feature should be activated at any given time; providing haptic feedback prior to enabling the microphone; and enabling the microphone to allow the user to speak the word for replacement or acceptance of alternative words. The methods, systems and computer program products of the present disclosure are now described in greater detail with reference to FIGS. 1-5.

Figure 1:
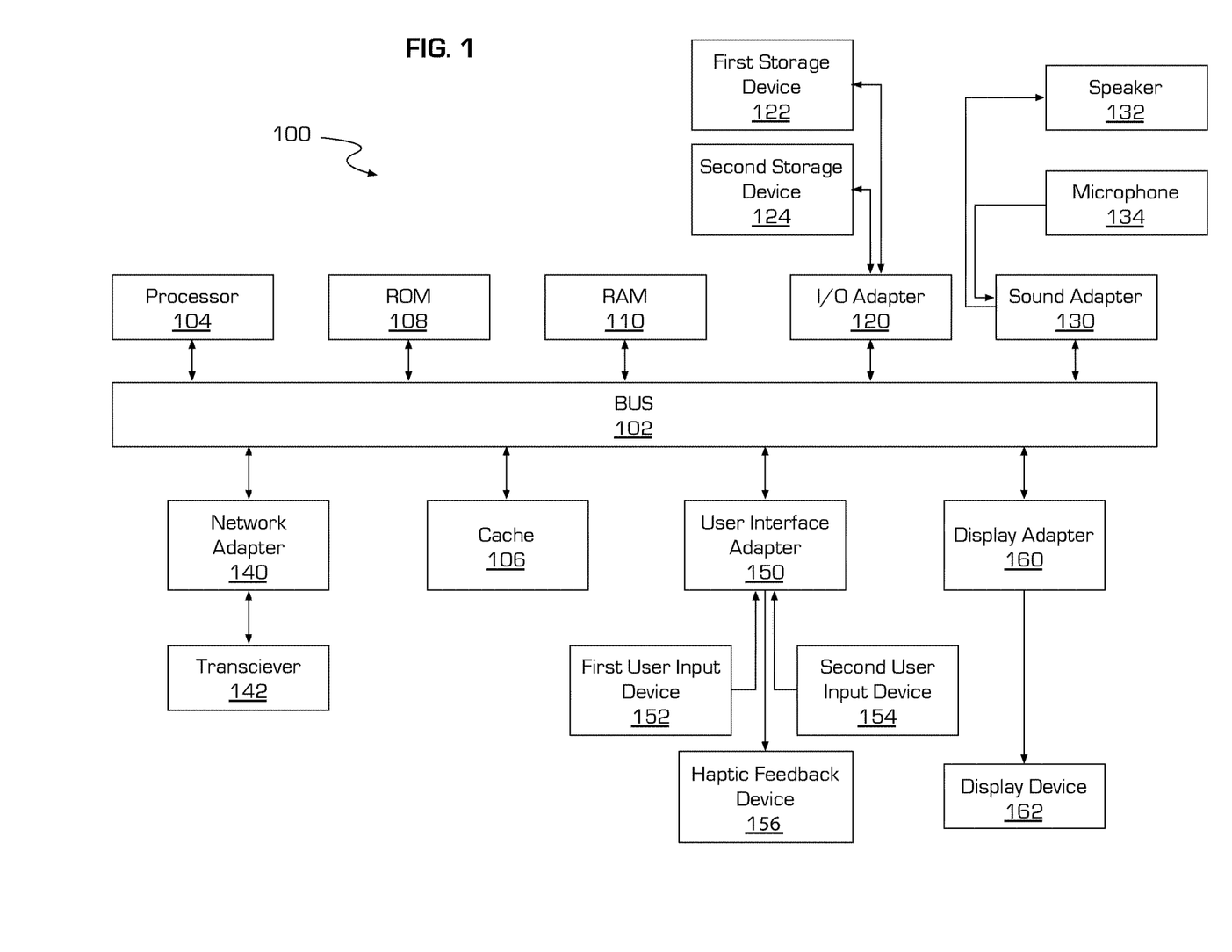
FIG. 1 is a representation of components of a mobile computing device, in accordance with an embodiment of the present disclosure.

An exemplary processing system 100 to which the present disclosure may be applied is shown in accordance with one embodiment. The processing system 100 includes at least one processor 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. One or more of these components may be implemented as individual components, or may be provided as a system-on-chip (SoC) integrated circuit (IC).

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. Moreover, while FIG. 1 illustrates the processing system 100 with two storage devices 122 and 124, embodiments of the present disclosure can be configured with one storage device or more than two storage devices. In embodiments where more than one storage device is present, the storage devices can be individually accessible or can be components of a Redundant Array of Inexpensive Disks (RAID) configured in any appropriate RAID configuration.

A speaker 132 and a microphone 134 are operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, and a second user input device 154 are operatively coupled to system bus 102 by user interface adapter 150. The user input devices 152 and 154 can be any of a keyboard, a mouse, touchscreen, a keypad, an image capture device, a motion sensing device, a microphone, a device incorporating the functionality of at least two of the preceding devices, and so forth. Moreover, the user input devices may be implemented as an on-screen keyboard with which a user can interact by way of a touchscreen. Of course, other types of input devices can also be used, while maintaining the spirit of the present disclosure. The user input devices 152 and 154 can be the same type of user input device or different types of user input devices. The user input devices 152 and 154 are used to input and output information to and from system 100.

Additionally, the user interface adapter 150 may couple the system bus 102 to a haptic feedback device 156. The haptic feedback device 156 can be implemented as a vibrating element. Alternatively, or additionally, the haptic feedback device can include an audible buzzer.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present disclosure provided herein.

In situations in which the enhanced autocorrect feature is not present, the user may experience the device autocorrect function misinterpreting and autocorrecting a word incorrectly. This can lead to frustration on the part of the user, since the process required to manually override the device autocorrect can be cumbersome and time consuming. Moreover, the device autocorrect software, generally, provides too many options for words that may not be commonly used by the user. Rather, the device autocorrect software utilizes a standardized dictionary in which word choices are provided based on a logical menu or taxonomy of related words, causing the user to have to scroll and select, sometimes numerous times, in order to have the autocorrect select the correct and intended word.

Figure 2A:
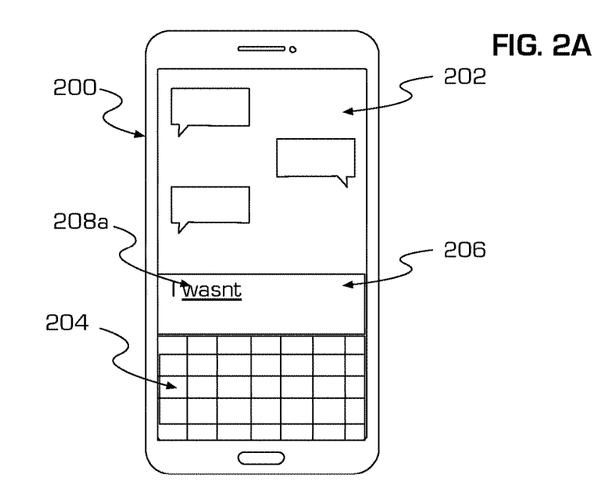
FIG. 2A is a representation of a display screen of a mobile device during operation of an embodiment of the present disclosure.
Figure 2B:
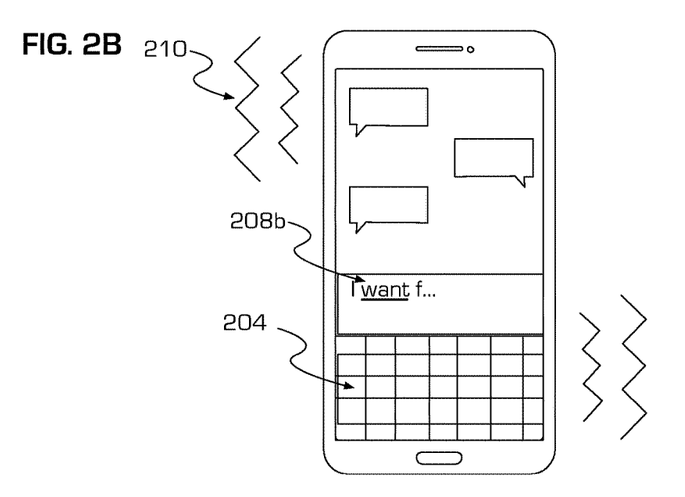
FIG. 2B is a representation of a display screen of a mobile device during operation of an embodiment of the present disclosure.
Figure 2C:
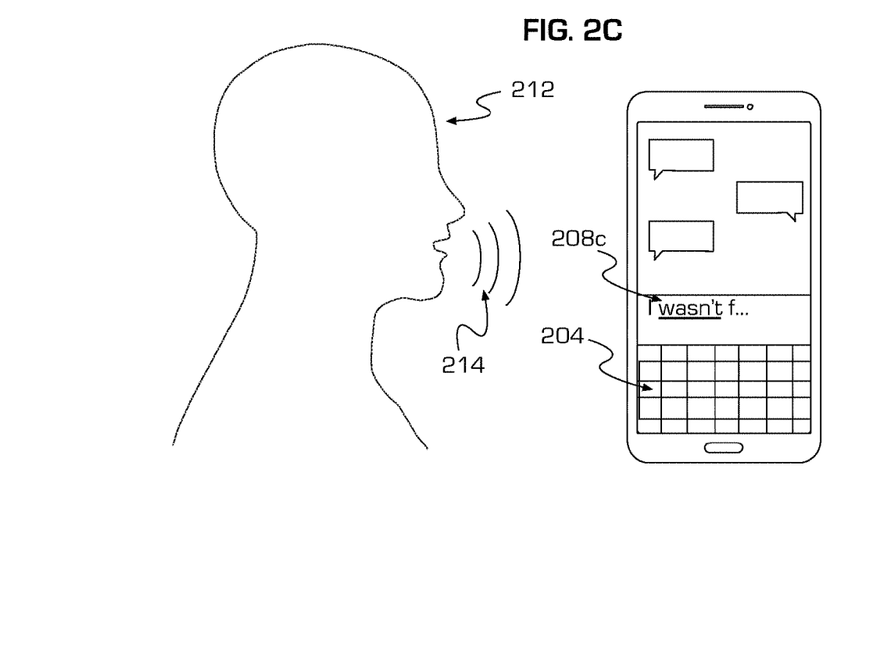
FIG. 2C is a representation of a display screen of a mobile device during operation of an embodiment of the present disclosure.

Referring to FIGS. 2A-2C, an embodiment of the present disclosure is shown. At a first stage, shown in FIG. 2A, a mobile device, such as the processing system 100 of FIG. 1, is used by a user to send and receiving text based messages via a messaging application 200, for example. The messaging application 200 provides a message display region 202 configured to display sent and received messages. Additionally, a message region 206 is provided in which text 208a is entered by the user with the aid of an on-screen keyboard 204.

In the example shown in FIG. 2A, the user has typed "wasnt" which the autocorrect software identifies as a typographical error. The autocorrect software may provide an indicator to the user that the word is identified as a typographical error. The identified word may be highlighting, underlining or contrast coloring the word. As the user continues typing on the on-screen keyboard 204, the autocorrect software automatically corrects the misspelled word based on a default dictionary, as shown in FIG. 2B. In this example the autocorrect software determines that the user intended to type "want" and thus corrects the text 208b accordingly. In addition, an embodiment of the present disclosure provides haptic feedback 210, such as a haptic feedback device 156, shown in FIG. 1, which provides a vibration, to alert the user that the autocorrect software has corrected the text 208b. The haptic feedback 210, additionally, alerts the user that the enhanced autocorrect feature of the present disclosure is activated.

As shown in FIG. 2C, the enhanced autocorrect feature awaits audio input 214 from the user 212. Thus, for example, if the user 212 intended for the typed word to be "wasn't" instead of "want" as corrected by the autocorrect, the user 212 can speak the intended word, e.g., "wasn't". An audio receiver, such as the microphone 134 shown in FIG. 1, detects the spoken word 214 from the user 212. Using the detected spoken word 214 coupled with machine learning-based speech recognition and user dictionaries, embodiments of the enhanced autocorrect feature of the present disclosure identify the user's intended word, and appropriately corrects the text 208c. In embodiments of the present disclosure, if the enhanced autocorrect feature is unable to interpret the user's spoken word 214 correctly, the user 212 may be presented, on the display device 162 of FIG. 1 for example, with suggested words from which to choose.

In some embodiments, the enhanced autocorrect feature can be configured to apply machine learning to determine the user's typical word usage within the context of the application being used, the recipient of the text (if applicable), tone of the preceding text, as well as any other determinate parameters. Additionally, based on the machine learning based evaluation, embodiments of the present disclosure can select a user dictionary from multiple user dictionaries.

The user dictionaries can be customized by a machine learning sub-system to provide the appropriate word choice for the particular situation. The user dictionaries are generated from learned words, e.g., words used by the user in previous situations. Additionally, different user dictionaries are generated for use in different contexts. For example, a first user dictionary may provide common word usage by the user in informal situations when using a messaging application and the recipient is identified in the user's contact list as belonging to a group labeled "Friends and Family". A second user dictionary may provide common word usage by the user in formal situations when the user is entering text in an email application, and more particularly, using a business-designated email application or business-related email address.

In one embodiment, only one user dictionary is generated. However, in order for the enhanced autocorrect to provide the appropriate word choice in a given situation, each learned word can be configured to include metadata providing context information. The context information can include application in which the word was previously used, contact group members to which the previous word usage was sent, as well as any other information appropriate for facilitating word choice.

It should be noted that, while the examples and embodiments provided herein focus on the English language, the systems, methods and program products of the enhanced autocorrect feature are not limited to only the English language, nor is the present disclosure limited to a single language. Rather, embodiments of the present disclosure can be configured to support multiple languages simultaneously, such that a third user dictionary may provide common word usage by the user in a second language, for example. Moreover, embodiments of the present disclosure can be configured to generate user dictionaries that provide common word usage in a mixture of languages, as may often be encountered in messages between bilingual family members. Such a mixture of languages in an individual message can provide significant difficulty for traditional autocorrect software.

As will be described in more detail below with reference to FIG. 3 and FIG. 4, in some embodiments, the enhanced autocorrect function includes three modes of operation: 1) "enabled", 2) "disabled" and 3) "intelligent". When placed in "enabled" mode, embodiments of the present disclosure activate the enhanced autocorrect feature whenever the device autocorrect software detects a typographical error. Once the enhanced autocorrect feature activates, embodiments of the present disclosure generate a notification action, such as a haptic feedback vibration, blinking an light emitting diode (LED), or display an on-screen alert (e.g., a pop-up), alerting the user that the system is now active and monitoring audio received by the microphone. The user speaks the correct or alternative word. Thereby, embodiments of the present disclosure audibly recognize the correct word or alternative word, corrects the text, and sends an accurate text message quickly and seamlessly.

In situations where ambient noise is high, or the user does not wish the microphone to be turned on by the enhanced autocorrect feature because of privacy or other concerns, the enhanced autocorrect feature can be placed in "disabled" mode. While in "disabled" mode, the enhanced autocorrect feature does not monitor whether the device autocorrect system detects any typographical errors while the user is composing a message. Thus, in "default" mode autocorrect functionality is provided only by the device autocorrect system.

In embodiments of the present disclosure so configured, an "intelligent" mode can be selected. "Intelligent" mode activates the enhanced autocorrect feature on a case-by-case basis. For example, when the enhanced autocorrect feature is in "intelligent" mode, the background, or ambient, noise level is measured each time the enhanced autocorrect feature is activated. If the ambient noise level is below a threshold value, the enhanced autocorrect feature operates as described with respect to "enabled" mode.

On the other hand, when ambient noise is measured to be above the threshold value, the enhanced autocorrect feature does not listen for a user's audio input. Instead, in embodiments of the present disclosure, the enhanced autocorrect feature displays at least one word choices selected from one or more user dictionaries generated and maintained by the enhanced autocorrect feature. Thus, the most frequently used words, within the appropriate context, are displayed to the user. The enhanced autocorrect feature monitors for a user tap on the desired word, which is then used to replace the misspelled word. In this way, the user is able to send an accurate text message quickly and seamlessly.

Moreover, the enhanced autocorrect feature in "intelligent" mode can be configured to apply machine learning techniques to determine when to activate the enhanced autocorrect feature based on other criteria in addition to, or instead of, ambient noise level. For example, the enhanced autocorrect feature's audio listening can be disabled if a user is participating on a telephone call while typing on the mobile device. Additionally, embodiments of the present disclosure can be configured to distinguish between ambient noise/words and words that are directed to the enhanced autocorrect feature. For example, if a word picked up by the microphone is similar or related to the word that is being autocorrected, then the enhanced autocorrect feature can be configured to assume that the picked-up word is intended, by the end user, to be used by the enhanced autocorrect feature. However, if the microphone picks up words unrelated to the word that is being autocorrected, then the enhanced autocorrect feature can be configured to disregard the unrelated words as ambient noise/words.

Figure 3:
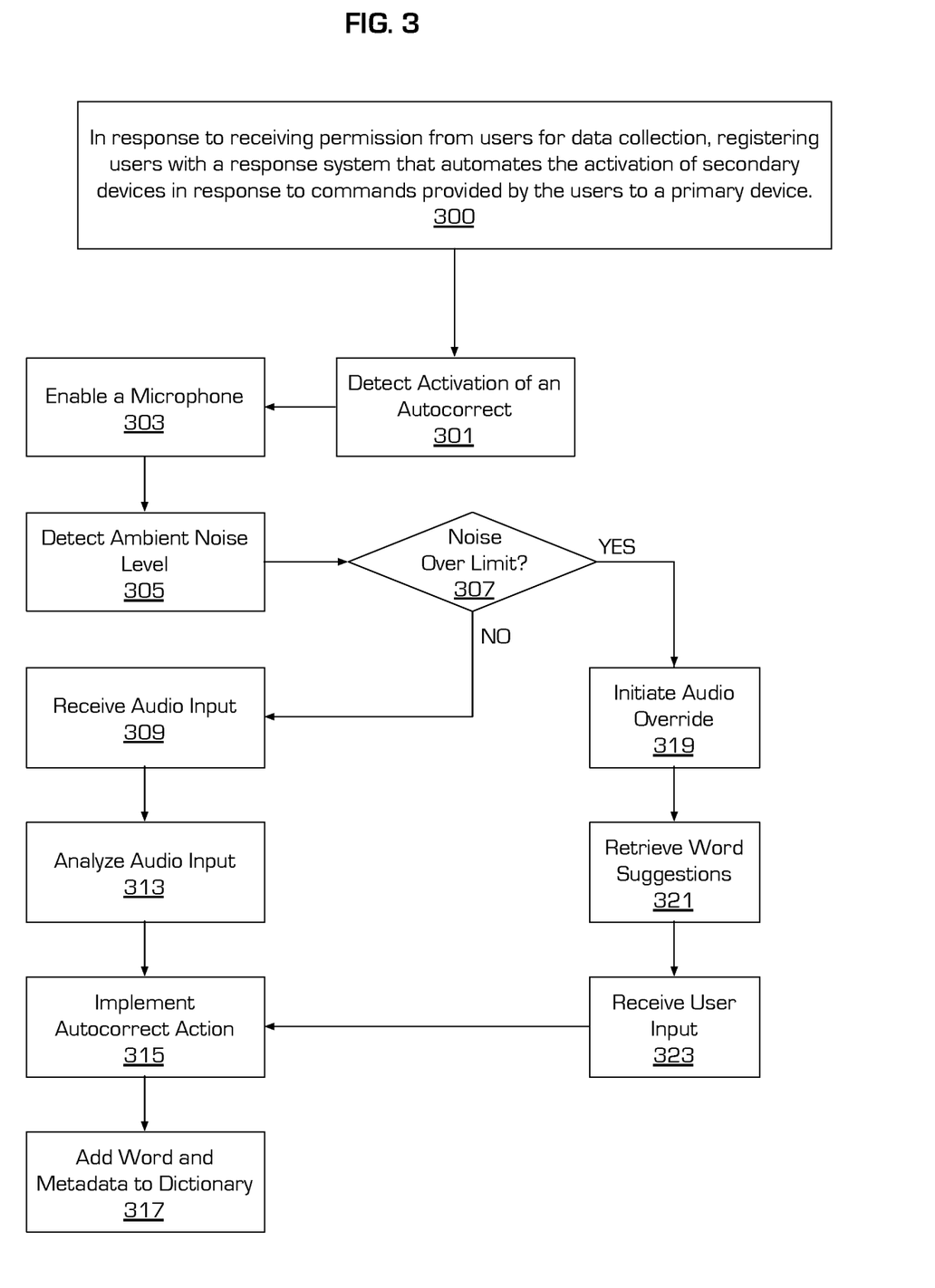
FIG. 3 is a block/flow diagram showing a system/method in accordance with an embodiment of the present disclosure.

In accordance with an embodiment of the present disclosure, a computer implemented method is shown in FIG. 3 that provides an enhanced autocorrect feature to, for example, a mobile device. In some embodiments, the method may begin at block 300, which can include registering users with the enhanced autocorrect feature. The method may begin with, in response to receiving permission from a user for data collection, registering users with the enhanced autocorrect feature. In some embodiments, the registration at block 300 can be performed once during an initialization phase of the enhanced autocorrect feature, such as during installation of a program product implementing the enhanced autocorrect feature, or at the first usage of the enhanced autocorrect feature on the device. In other embodiments, the registration at block 300 can be performed at each activation of the enhanced autocorrect feature, such as upon start-up of the device on which the enhanced autocorrect feature is implemented.

To the extent that implementations of the enhanced autocorrect feature collect, store, or employ personal information provided by, or obtained from, individuals (for example, current locations of the user, historical word usage, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In response to a portion of text not appearing in a system dictionary stored, for example, in one of the first storage 122 or the second storage 124 shown in FIG. 1, the present embodiment detects activation of an device autocorrect feature by way of a monitoring operation executed by a processor of the mobile device (such as, processor 104 shown in FIG. 1) at block 301.

The present embodiment enables a microphone, such as microphone 134 shown in FIG. 1, in response to activation of the autocorrect feature 303. Additionally, an indicator can be activated to alert a user that the microphone 134 has been activated as part of a voice-enabled enhanced autocorrect feature. The indicator can be any one or more of a haptic feedback device 156, an audible tone issued through a speaker 132, or a notification pop-up on a display device 162, as shown in FIG. 1.

At block 305, the present embodiment detects, via the microphone 134, ambient noise. The processor 104, of the present embodiment determines if the detected noise level exceeds a predetermined limit threshold at block 307. The threshold is determined based on the ability of the microphone and signal processing systems/functions of the mobile device to accurately discern the user's audio inputs over any ambient or background noise. In situations where the ambient noise level is below the threshold, the present embodiment proceeds to block 309, otherwise the present embodiment proceeds to block 319.

At block 309, audio input is received, via the microphone 134, from a user responsive to a word replacement by the device autocorrect feature. The processor 104 of the present embodiment analyzes the audio input to determine the desired word at block 313. The analysis performed on the audio input can include applying a speech-to-text conversion, which can be implemented by machine learning techniques executed by the processor 104. In other embodiments of the present disclosure, the speech-to-text conversion may be implemented using machine learning techniques executed on one or more cloud-based servers configured to provide such a function as a service accessed by way of an application programming interface (API).

Upon completion of the analysis of block 313, the present embodiment implements an enhanced autocorrect action, at block 315, based on the audio input. The user can provide, as audio input, a corrected word for insertion into the text, or the audio input can be a command instructing the enhanced autocorrect feature to, for example, deactivate the enhanced autocorrect feature for a period of time, or accept the correction made by the device autocorrect. Some embodiments can be configured to understand and execute other commands relating to the operation of the enhanced autocorrect feature as well.

Additionally, the enhanced autocorrect feature of the present embodiment generates and maintains a user dictionary at block 317. The user dictionary is customized to include common terminology used by the user by adding words that the user provides during each execution of block 309. The user dictionary can be configured to support multiple languages and dialects. Moreover, multiple dictionaries may be maintained. In some embodiments, the user dictionary is stored on the mobile device in, for example, the first storage device 122 or the second storage device 124. In other embodiments, the user dictionary is stored on a cloud-based datacenter and accessible by way of an API. The cloud-based server providing speech-to-text conversion services and the cloud-based datacenter storing the user dictionary can be the same server, different servers at the same geographic location, or servers at different geographic locations.

As noted above, if the noise level is determined to be above the threshold at block 307, the present embodiment initiates an audio override at block 319. The audio override can also be initiated based on personal historic patterns. For example, a user may not wish to have the microphone 134 activated while at work, thus embodiments can be configured to take geographic location into consideration when determining whether to activate the microphone 134. Other parameters and conditions can be taken into consideration, as well, for determining whether to activate the microphone 134.

In cases where the present embodiment determines that an audio override should be implemented, the enhanced autocorrect feature presents the user with one or more words to choose from at block 321. The presented words can be selected from one or more user dictionaries maintained by the present embodiment. The present embodiment receives the user's input, at block 323, identifying a selected word from among the words presented at block 321. The present embodiment proceeds to block 315 where the selected word is applied to the text as the intended correct word, and the process proceeds as described above.

Figure 4:
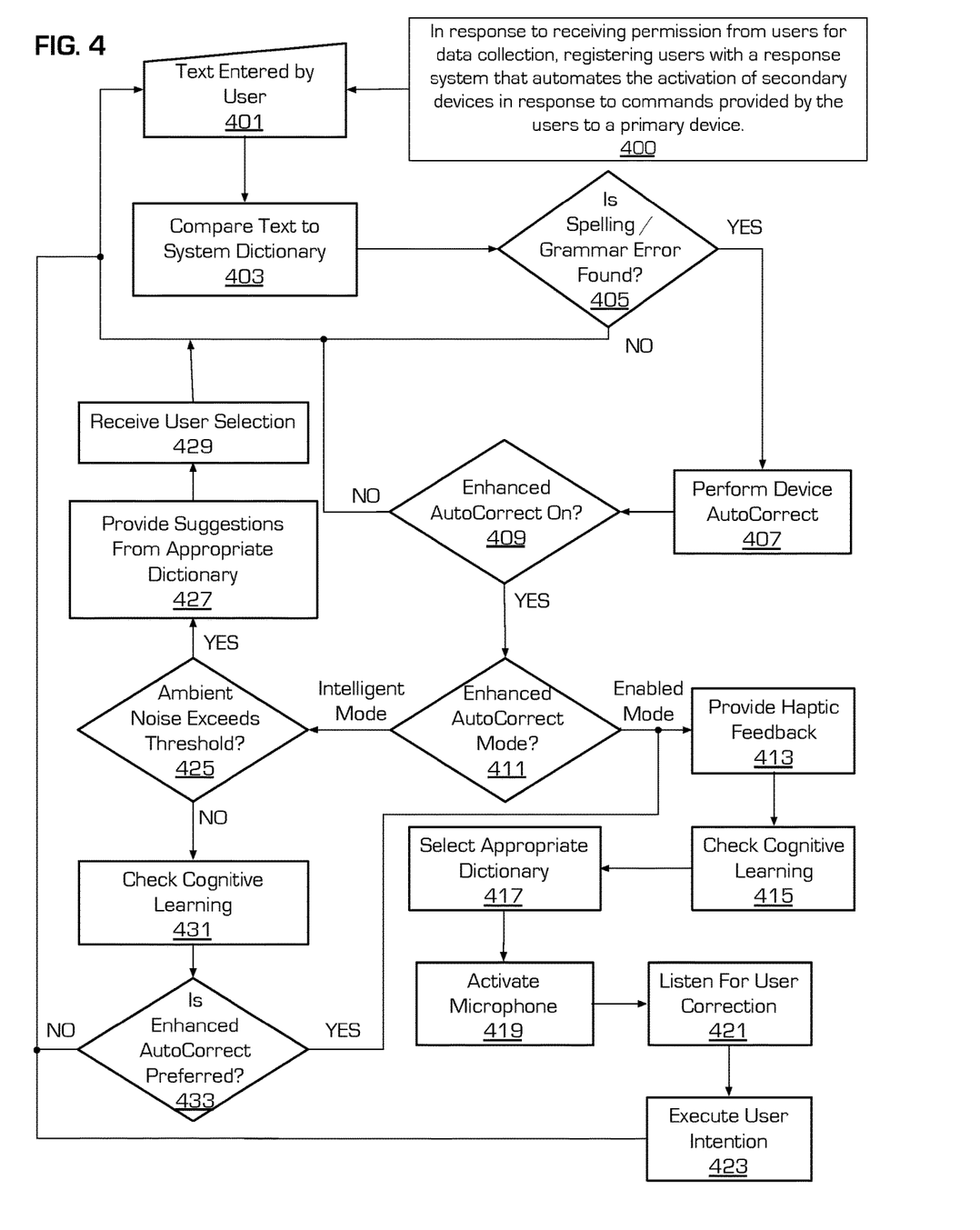
FIG. 4 is a block/flow diagram showing a system/method in accordance with an embodiment of the present disclosure.
Figure 5:
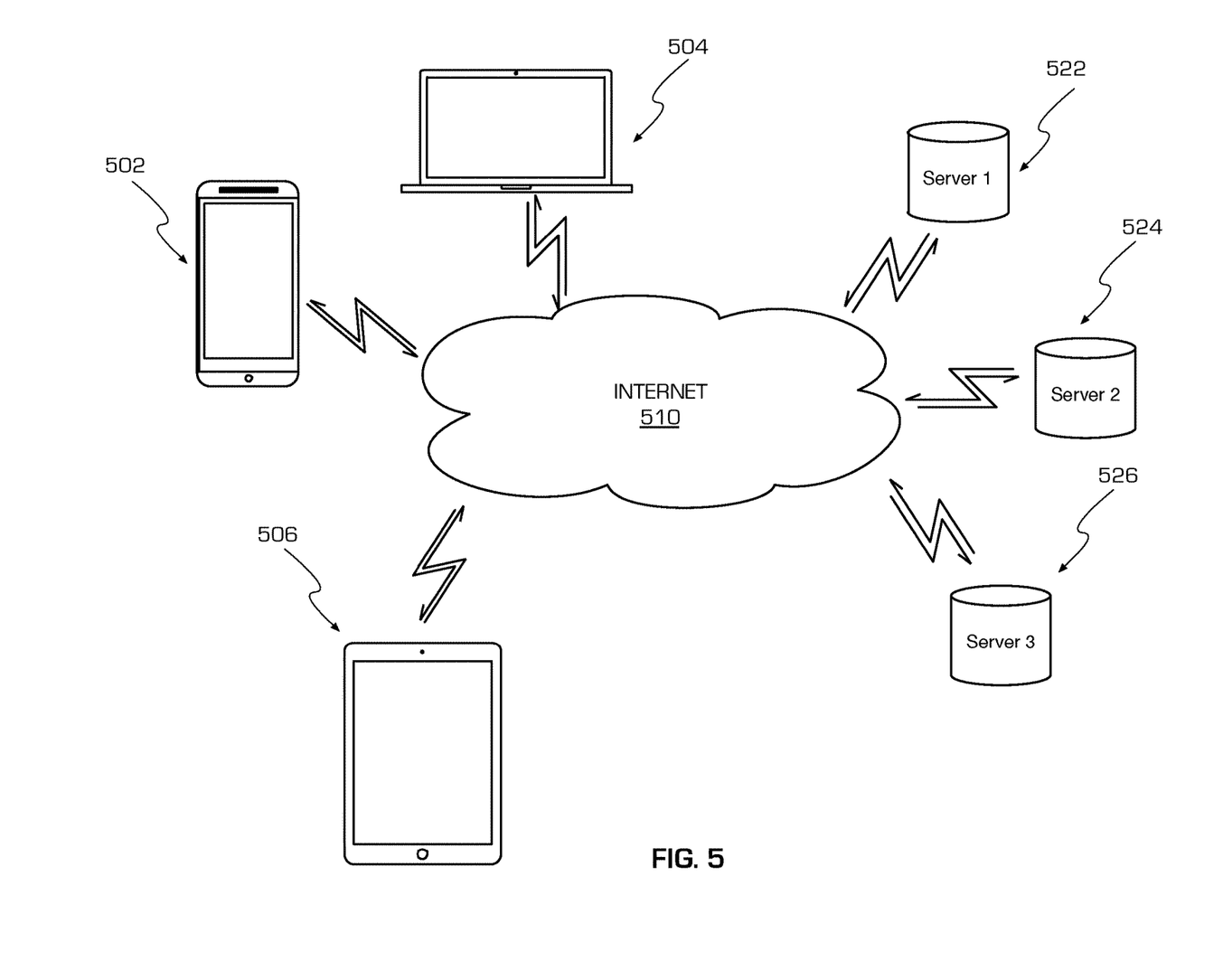
FIG. 5 is a representation of a distributed implementation in accordance with an embodiment of the present disclosure.

In an embodiment, a computer implemented method, shown in FIG. 4, begins at block 400, which can include registering users with the enhanced autocorrect feature. The method may begin with, in response to receiving permission from a user for data collection, registering users with the enhanced autocorrect feature. In some embodiments, the registration at block 400 can be performed once during an initialization phase of the enhanced autocorrect feature, such as during installation of a program product implementing the enhanced autocorrect feature, or at the first usage of the enhanced autocorrect feature on the device. In other embodiments, the registration at block 400 can be performed at each activation of the enhanced autocorrect feature, such as upon start-up of the device on which the enhanced autocorrect feature is implemented.

To the extent that implementations of the enhanced autocorrect feature collect, store, or employ personal information provided by, or obtained from, individuals (for example, current locations of the user, historical word usage, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

With registration at block 400 completed, the process continues with a user entering text in block 401. In the present embodiment, the user can enter text in any of a variety of applications found on a mobile device (e.g., processing system 100), for example, a note taking application, text messaging application, email, productivity application, etc. that are capable of receiving text input. As the user types out text, a processor of the mobile device checks for spelling and grammatical errors by comparing the typed words or phrases against a system dictionary at block 403. The system dictionary can be stored locally in memory on the mobile device or stored remotely in a storage of a cloud services provider. When a spelling or grammatical error is found at block 405, the present embodiment proceeds to block 407. Otherwise, if no spelling or grammatical error is identified in the currently typed word, the method returns to block 401. It should be noted that the processing loop defined by blocks 401, 403 and 405 can occur nearly simultaneously from the perspective of the user, such that the user does not experience a lag in performance of the mobile device, and is able to type at a substantially continuous pace.

When a spelling or grammatical error is detected at block 405, the present embodiment performs a device autocorrect at block 407. The device autocorrect, in the context of embodiments of the present disclosure, is understood to be a conventional autocorrect function. Activation of the device autocorrect causes the present embodiment to determine, at block 409, whether the enhanced autocorrect function is enabled. If the enhanced autocorrect function is disabled, the present embodiment returns to block 401. When block 409 determines that the enhanced autocorrect is enabled, the present embodiment proceeds to block 411 in which the user's desired mode of operation for the enhanced autocorrect is determined. Specifically, the enhanced autocorrect can function in two modes, namely enabled mode and intelligent mode. The two enhanced autocorrect modes will be described further below.

In the enabled mode, the present embodiment activates a haptic feedback function (e.g., vibration) of the mobile device at block 413, notifying the user that the enhanced autocorrect has activated. Alternative signaling can be employed to notify the user that the enhanced autocorrect has activated as well. For example, a message or icon can be displayed on the mobile device screen, an audible tone can be issued from a speaker/buzzer of the mobile device, or an LED can be energized. The haptic feedback or signaling accomplishes to functions, first the user is notified that the mobile device microphone is activated and listening, and second that the enhanced autocorrect is ready to receive verbal input from the user.

In the present embodiment, the following blocks, namely blocks 415, 417 and 419, can be executed simultaneously, in the order shown in FIG. 4 or in any other order, relative to each other, deemed appropriate. Thus, after activating the haptic feedback at block 413, a cognitive learning process is executed at block 415 in order to determine the most appropriate user dictionary to use. The dictionary selection at block 417 can be dependent on the time of day, day of the week, particular application with which the user is currently interacting, and/or other appropriate criteria. In an embodiment of the present disclosure in which only one user dictionary is present, blocks 415 and 417 can be omitted.

At block 419 the present embodiment activates a microphone of the mobile device, and listens for verbal input from the user at block 421. The verbal input can be a spoken form of a word or phrase intended to replace the text being autocorrected. Alternatively, the verbal input can be one or more predefined system commands instructing the enhanced autocorrect to, for example, accept the text as corrected by the device autocorrect or the enhanced autocorrect, temporarily disable the enhanced autocorrect for the current typing session, switch to a different user dictionary if available, provide suggested replacement words, etc. The system commands listed above are provided for illustrative purposes and not intended to limit the system commands in any way.

At block 423, the present embodiment executes the user's intention as expressed verbally at block 421. Thus, if the user spoke a replacement word, the present embodiment replaces the autocorrected text with the new replacement word. Alternatively, if one or more system commands are spoken by the user at step 421, then at block 423 those commands are processed and executed as appropriate. Upon completion of the process at block 423, the present embodiment returns to block 401, allowing the user to continue entering text.

An alternative scenario occurs at block 411 if the enhanced autocorrect mode is set to intelligent mode. With the enhanced autocorrect mode set to intelligent mode, the present embodiment proceeds from block 411 to block 425. At block 425, the present embodiment detects ambient noise level. If a determination is made at block 425 that the ambient noise level exceeds a noise threshold value, such that the enhanced autocorrect system would not be able to reliable capture and interpret verbal inputs from the user, the enhanced autocorrect system does not engage, and instead the enhanced autocorrect system displays, on the mobile device screen, one or more word suggestions at block 427. The word suggestions can include, for example, suggested spellings (including the originally entered text), and alternative words (e.g., synonyms). The one or more word suggestions are based on a user dictionary maintained by the enhanced autocorrect system. The one or more words can be presented as a list from which the user can select the appropriate word by touching the screen at the location of the word with a finger or a pointing device at block 429. Alternatively, a graphical user interface (e.g., mouse pointer, etc.) can be provided by the mobile device and controlled by hardware keys. Once a selection is made the process returns to block 401.

However, if the ambient noise level is below the noise threshold value, the present embodiment proceeds to block 431 where cognitive learning processes determine, based on observed criteria, when a user prefers to use the enhanced autocorrect, or rely on the device autocorrect instead. Based on the result of the cognitive learning executed at block 431, the present embodiment determines whether use of the enhanced autocorrect is preferred in the current situation at block 433. If the enhanced autocorrect is not preferred in the current situation, the present embodiment returns to block 401, otherwise, the present embodiment continues to block 413, where the present embodiment activates a haptic feedback function (e.g., vibration) of the mobile device, notifying the user that the enhanced autocorrect has been activated. Alternative signaling can be employed to notify the user that the enhanced autocorrect has activated as well. For example, a message or icon can be displayed on the mobile device screen, an audible tone can be issued from a speaker/ buzzer of the mobile device, or an LED can be energized. The haptic feedback or signaling accomplishes two functions, first the user is notified that the mobile device microphone is activated and listening, and second that the enhanced autocorrect is ready to receive verbal input from the user.

In the present embodiment, the following blocks, namely blocks 415, 417 and 419, can be executed simultaneously, in the order shown in FIG. 4 or in any other order, relative to each other, deemed appropriate. Thus, after activating the haptic feedback at block 413, a cognitive learning process is executed at block 415 in order to determine the most appropriate user dictionary to use. The dictionary selection at block 417 can be dependent on the time of day, day of the week, particular application with which the user is currently interacting, and/or other appropriate criteria. In an embodiment in which only one user dictionary is present, blocks 415 and 417 can be omitted.

At block 419 the present embodiment activates a microphone of the mobile device, and listens for verbal input from the user at block 421. The verbal input can be a spoken form of a word or phrase intended to replace the text being autocorrected. Alternatively, the verbal input can be one or more predefined system commands instructing the enhanced autocorrect to, for example, accept the text as corrected by the device autocorrect or the enhanced autocorrect, temporarily disable the enhanced autocorrect for the current typing session, switch to a different user dictionary if available, provide suggested replacement words, etc. The system commands listed above are provided for illustrative purposes and not intended to limit the system commands in any way.

At block 423, the present embodiment executes the user's intention as expressed verbally at block 421. Thus, if the user spoke a replacement word, the present embodiment replaces the autocorrected text with the new replacement word. Alternatively, if one or more system commands are spoken by the user at step 421, then, at block 423, those commands are processed and executed as appropriate. Upon completion of the process at block 423, the present embodiment returns to block 401, allowing the user to continue entering text.

As shown in FIG. 1 and described above, embodiments can be implemented on a mobile device using the various hardware and software components provided by the mobile device, such as the processor 104, RAM 110, first storage device 122, second storage device 124, haptic feedback device 156, microphone 134 and display device 162. However, in embodiments shown in FIG. 5, one or more components may be provided by way of distributed network 510, e.g., internet-based cloud services. For example, mobile devices such as mobile phones 502, laptop computers 504 and tablet devices 506 connected to the Internet 510 can be configured to use server 1, server 2 and/or server 3 for storing the user dictionary, configuration files, and other data used by some embodiments. Moreover, one or more of server 1, server 2 and server 3 may be configured to provide the mobile devices with speech-to-text services in order to realize speech recognition of the a user's audio inputs. The distributed components can be provided by the same server, or different servers.

Some embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Thus, computer readable storage medium as intended herein should be understood to encompass only non-transitory computer readable medium, such as CD-ROM, DVD, hard disk, Flash memory or secure digital (SD) cards.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment", as well as other variations thereof, means that a particular feature, structure, characteristic, and so forth described in connection with the embodiment is included in at least one embodiment of the present disclosure. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of systems and methods of an audio interface enhanced autocorrect feature (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for enabling an audio interface enhanced autocorrect feature in a mobile device, the method comprising;
   detecting activation of an autocorrect feature of a mobile device in response to a portion of incorrectly typed text not appearing in a system dictionary;
   determining that an automatic override of the autocorrect feature is not triggered by historical preferences of the user, the historical preferences including locations at which the audio interface enhanced autocorrect feature is not actuated;
   determining whether ambient noise is below a threshold level;
   sending a signal to actuate a haptic feedback element of the mobile device indicating to a user of the mobile device of incorrected typed text not appearing in the system dictionary for autocorrect;
   enabling a microphone in response to activation of the autocorrect feature when the ambient noise is below the threshold level;
   receiving audio input from a user responsive to a word replacement for the incorrectly typed text by the autocorrect feature, the user being prompted for said audio input by said haptic feedback element; and
   implementing an enhanced autocorrect action based on the audio input.

2. The method of claim 1, further comprising limiting the audio input based on environmental conditions.

3. The method of claim 2, further comprising detecting via the microphone ambient noise above a threshold.

4. The method of claim 1, further comprising initiating an audio override based on personal historic patterns.

5. The method of claim 4, further comprising using machine learning.

6. The method of claim 1, further comprising analyzing the audio input to determine the desired word.

7. The method of claim 6, wherein the analyzing includes using speech-to-text conversion.

8. The method of claim 6, further comprising generating and maintaining a user dictionary customized to include common terminology used by the user.

9. The method of claim 8, wherein the user dictionary supports multiple languages and dialects.

10. A system comprising;
a display screen configured to present a graphical user interface;
a microphone;
a haptic feedback element to a user;
a historical preference database;
storage structured to store data and processor executable instruction code; and
a processor operationally coupled with the display screen and storage, the processor configured to execute the instruction code stored in the storage to operatively:
   detect activation of an autocorrect feature of a mobile device in response to a portion of incorrectly typed text not appearing in a system dictionary,
   determining that an automatic override of the autocorrect feature is not triggered by historical preferences of the user in the historical preference database, the historical preferences including locations at which the audio interface enhanced autocorrect feature is not actuated;
   determine whether ambient noise is below a threshold level using the microphone;
   sending a signal to actuate a haptic feedback element of the mobile device indicating to a user of the mobile device of incorrected typed text not appearing in the system dictionary for autocorrect;
   enable microphone in response to activation of the autocorrect feature,
   receive audio input from a user responsive to a word replacement for the incorrectly typed text by the autocorrect feature, the user being prompted for said audio input by said haptic feedback element; and
   implement an enhanced autocorrect action based on the audio input.

11. The system of claim 10, wherein the processor further executes instruction code to limit the audio input based on environmental conditions.

12. The system of claim 11, wherein the processor further executes instruction code to detect, via the microphone, ambient noise above a threshold.

13. The system of claim 10, wherein the processor further executes instruction code to initiate an audio override based on personal historic patterns.

14. The system of claim 13, wherein the processor further executes instruction code to use machine learning.

15. The system of claim 10, wherein the processor further executes instruction code to analyze the audio input to determine the desired word.

16. The system of claim 15, wherein analyzing audio input includes using speech-to-text conversion.

17. The system of claim 16, wherein the processor further executes instruction code to generate and maintain a user dictionary customized to include common terminology used by the user.

18. The system of claim 17, wherein the user dictionary supports multiple languages and dialects.

19. A computer program product including one or more computer readable storage mediums collectively storing program instructions that are executable by a processor or programmable circuitry to cause the processor or programmable circuitry to perform operations comprising:
   detecting activation of an autocorrect feature of a mobile device in response to a portion of incorrectly typed text not appearing in a system dictionary;
   determining that an automatic override of the autocorrect feature is not triggered by historical preferences of the user, the historical preferences including locations at which the audio interface enhanced autocorrect feature is not actuated;
   sending a signal to actuate a haptic feedback element of the mobile device indicating to a user of the mobile device of incorrected typed text not appearing in the system dictionary for autocorrect;
   enabling a microphone in response to activation of the autocorrect feature;
   receiving audio input from a user responsive to a word replacement for the incorrectly typed text by the autocorrect feature, the user being prompted for said audio input by said haptic feedback element;
   analyzing the audio input to determine the desired word; and
   implementing an enhanced autocorrect action based on the audio input.

20. The computer program product of claim 19, wherein the operations further comprising generating and maintaining a user dictionary customized to include common terminology used by the user.

* * * * *